Patented Sept. 7, 1937

2,092,387

UNITED STATES PATENT OFFICE 2,092,387

PROCESS OF PREPARING DIOXAZINE COMPOUNDS AND SUBSTANCES SO OBTAINED

Arnold Brunner and Karl Thiess, Frankfort-on-the-Main, Germany, assignors to General Aniline Works, Inc., New York, N. Y., a corporation of Delaware No Drawing. Application December 29, 1933, Serial No. 704,596. In Germany December 31, 1932

10 Claims. (Cl. 260—28)

Our present invention relates to a process of preparing dioxazine compounds, and to the substances so obtained.

We have found that strongly colored compounds which can be used as intermediate products for the manufacture of dyestuffs are obtained by a process which comprises heating in presence or absence of a solvent or diluent and in presence of an aromatic acid chloride a diarylaminoquinone of the following general formula:

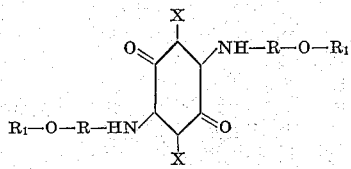

wherein X represents hydrogen, halogen or methyl, R an aromatic radical of the benzene and naphthalene series, $R_1$ an alkyl, an aryl or an aralkyl group of the benzene series, and wherein the groups R—O—$R_1$ are identical, $OR_1$ being attached to R in ortho-position to the NH group.

As aromatic acid chlorides there may be used: aromatic carboxylic acid chlorides, such as benzoyl chloride, benzotrichloride or a naphthoyl chloride, for instance betanaphthoyl chloride, or aromatic sulfonic acid chlorides, such as paratoluenesulfo chloride, benzenesulfo chloride, or a naphthalenesulfo chloride. By the reaction which takes a smooth and rapid course the groups —$OR_1$ are split off. In the simplest case it probably proceeds according to the following equation:

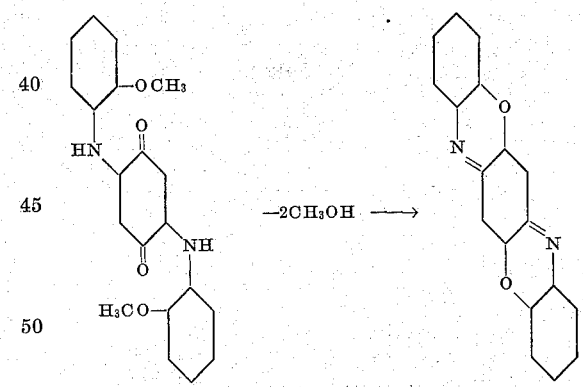

The substances obtainable according to our new process are distinguished by the fact that they are obtained in a particularly good state of purity.

The diarylaminoquinones of the above formula used as starting materials are obtainable by condensing 1.4-benzoquinones with the corresponding aromatic amino compounds.

The dioxazines thus produced may be transformed by sulfonation into dyestuffs which are soluble in water and dye cotton particularly pure tints. As regards the purity of the shades the dyeings produced with these dyestuffs are in most cases superior to those of the sulfonated dioxazines built up from organic amino compounds without an —$OR_1$ group in ortho-position. By sulfonating, for instance, the dichlorotriphenedioxazine made from dianilidodichloroquinone, a dull brownish-red dyestuff is obtained; from ortho.ortho'-dimethoxydianilidodichloroquinone, however, the same dichlorotriphenedioxazine is obtained in a considerably purer form, so that by a suitable sulfonation a beautiful red is obtained. In the form of their barium, calcium or other suitable salts these dyestuff sulfonic acids may also be used as pigments.

The following examples illustrate the invention. The parts are by weight unless otherwise stated:

(1) 10 parts of the diarylaminoquinone from 1 molecular proportion of chloranil and 2 molecular proportions of 1-amino-2-methoxybenzene are boiled for 30 minutes in 120 parts of nitrobenzene while adding 12 parts of benzoyl chloride. The solution soon assumes a red coloration and crystals are precipitated. After cooling the product is filtered and washed with alcohol. A red crystalline mass is obtained in a good yield. The product dissolves in concentrated sulfuric acid to a pure blue solution; on dilution with ice it separates in the form of a brilliant red precipitate.

5 parts of the oxazine made according to the preceding paragraph are dissolved in 20 times their weight of fuming sulfuric acid containing 20 per cent. of $SO_3$. After 1 to 2 hours' stirring at ordinary temperature, the solution is poured on ice and filtered by suction. A solution of sodium carbonate is added so as to produce the sodium salt. The product is subsequently washed with very dilute sodium chloride solution and finally dried. The dyestuff dissolves in water to a red solution. By a solution of barium chloride it is precipitated in the form of a brilliant red pigment.

(2) By substituting for the nitrobenzene in Example 1 150 parts of chlorobenzene and boiling for 4 hours, the same result is obtained.

(3) By substituting in Example 1 for the diarylaminoquinone from chloranil and 1-amino-2-methoxybenzene that from 1 molecular proportion of trichlorotoluquinone and 2 molecular proportions of 1-amino-2-methoxybenzene, a product is obtained the properties of which are similar to those of the product described in the first paragraph of Example 1.

(4) 10 parts of the diarylaminoquinone from 1 molecular proportion of chloranil and 2 molecular proportions of 1-amino-2-methoxybenzene are boiled for 70 minutes in 50 parts of trichlorobenzene with addition of 10 parts of benzoyl chloride. The product is identical to that obtainable as described in the first paragraph of Example 1.

(5) By using in Example 1 the diarylaminoquinone from 1 molecular proportion of chloranil and 2 molecular proportions of 1-amino-2-ethoxybenzene and substituting for the benzoyl chloride 14 parts of para-toluenesulfochloride, the same product is obtained.

(6) By using in Example 1 the diarylaminoquinone from 1 molecular proportion of chloranil and 2 molecular proportions of ortho-aminodiphenylether, the product obtained is likewise identical with that obtainable according to Example 1.

(7) 23 parts of the diarylaminoquinone from 1 molecular proportion of chloranil and 2 molecular proportions of 4-benzoylamino-2-amino-1-methoxybenzene are boiled for 1 hour in 250 parts of nitrobenzene in the presence of 20 parts of benzoyl chloride. The product is worked up and then forms a powder which has a copper gloss and is soluble in concentrated sulfuric acid to a pure blue solution.

By sulfonating the product so obtained for 20 hours at ordinary temperature in 20 times its weight of fuming sulfuric acid containing 20 percent. of $SO_3$ a dyestuff is obtained which dyes cotton ruby red tints.

(8) 25 parts of the diarylaminoquinone from 1 molecular proportion of chloranil and 2 molecular proportions of 1-amino-4-benzoylamino-3-methyl-6-methoxybenzene are boiled for 1 hour in 300 parts of nitrobenzene together with 20 parts of benzoyl chloride. The product is worked up whereby a crystalline mass is obtained which has a metallic luster and is soluble in concentrated sulfuric acid to a pure blue solution. Only traces of the product dissolve in chlorobenzene, the solution being a rose-red.

5 parts of the dioxazine so obtained are introduced, while stirring, into 15 times their weight of fuming sulfuric acid containing 20 per cent. of sulfuric anhydride, and the mixture is heated within 5 hours up to the temperature of 95° C. to 100° C. The blue reaction mass is given on ice and the dyestuff is precipitated from the resultant solution by addition of sodium chloride. It dyes cotton from a dye bath containing sodium chloride beautiful blue tints.

(9) 10 parts of the diarylaminoquinone from 1 molecular proportion of chloranil and 2 molecular proportions of 3-amino-4-methoxydiphenylmethane are boiled for 40 minutes in 45 parts of nitrobenzene together with 12 parts of benzoyl chloride. The dioxazine derivative is obtained in the form of brilliant dark crystals which dissolve in concentrated sulfuric acid to a blue solution. On dilution with ice the product is precipitated in the form of red flakes.

5 parts of the oxazine so obtained are introduced into 20 times their weight of concentrated sulfuric acid of 100 per cent. strength. After half an hour's stirring at ordinary temperatures the blue solution is given on ice and filtered by suction. Sodium carbonate solution is added in order to produce the sodium salt which is washed with an about 20% sodium chloride solution and dried. The dyestuff is soluble in water to a red solution. It dyes non-mordanted cotton beautiful red tints.

(10) 10 parts of the diarylaminoquinone from 1 molecular proportion of chloranil and 2 molecular proportions of 1-amino-2.5-dimethoxybenzene are treated as in Example 9. Crystals are obtained which have a greenish luster and are soluble in concentrated sulfuric acid to a blue solution.

By dissolving the oxazine so obtained in 20 times its weight of fuming sulfuric acid containing 20 per cent. of sulfuric anhydride and heating the solution for a short time on a water bath, a dyestuff is obtained which dyes cotton violet-pink tints.

(11) 10 parts of the diarylaminoquinone from 1 molecular proportion of chloranil and 2 molecular proportions of 3.6-dimethoxy-4-aminodiphenyl are boiled for 15 minutes in 50 parts of nitrobenzene together with 7.5 parts of benzoyl chloride. The product is worked up and then forms a crystalline mass having a metallic luster.

By heating the product so obtained for 1½ hours on a water bath together with 20 times its weight of fuming sulfuric acid containing 20 per cent. of sulfuric anhydride a dyestuff is obtained which dyes cotton violet tints.

(12) 10 parts of the diarylaminoquinone from 1 molecular proportion of chloranil and 2 molecular proportions of 4-nitro-2-amino-1-methoxybenzene are boiled for 1 hour in 120 parts of nitrobenzene together with 12 parts of benzoyl chloride. The product is worked up and then forms a crystalline mass of a copper luster. Its solution in concentrated sulfuric acid is bright blue; on addition of ice the new substance is precipitated in the form of beautiful orange-red flakes. The sulfonation is carried out in the usual manner.

(13) 5 parts of the diarylaminoquinone from 1 molecular proportion of chloranil and 2 molecular proportions of 4.4'-diamino-3.3'-dimethoxydiphenyl prepared by boiling in alcohol are boiled for 3 hours in 60 parts of nitrobenzene together with 5 parts of benzoyl chloride. The mass assumes a deep reddish violet coloration and solidifies on cooling to a crystalline magma. The product is isolated in the form of greenish needles which have a metallic luster and dissolve in concentrated sulfuric acid to a greenish-blue solution. On addition of ice the new substance is precipitated in the form of blue flakes.

5 parts of the dioxazine so prepared are dissolved in 100 parts by volume of sulfuric acid monohydrate; the solution is kept for 14 hours at 90° C. to 95° C.; the temperature is then raised to 185° C. and the blue solution is stirred for 20 hours at 180° C. to 185° C. The product is worked up as indicated in the second paragraph of Example 8. The dyestuff dyes cotton from a neutral bath containing sodium chloride violet tints.

(14) By substituting in the preceding example for the benzoyl chloride 7 parts of benzotrichloride, the same substances are obtained.

(15) 10 parts of the diarylaminoquinone from 1 molecular proportion of chloranil and 2 molecular proportions of 2-amino-1-naphtholmethyl-ether are boiled for 20 minutes in 50 parts of nitrobenzene together with 12 parts of benzoyl chloride. The dioxazine is obtained in the form of small crystals of a greenish luster.

The product so obtained is sulfonated at ordinary temperature during 5 hours in 20 times its weight of fuming sulfuric acid containing 20 per cent. of sulfuric anhydride. The dyestuff obtained dyes cotton violet tints.

(16) 10 parts of the diarylaminoquinone from 1 molecular proportion of chloranil and 2 molecular proportions of 3-amino-4-methoxydiphenyl are boiled for 3 to 5 hours in 150 parts of nitrobenzene together with 12 parts of benzoyl chloride. Dark red crystals are obtained which have a splendid golden luster and are soluble in sulfuric acid to a blue solution.

2 parts of the oxazine so obtainable are dissolved in 40 parts of sulfuric acid of 95 per cent. strength. After 16 hours the product is worked up. A dyestuff is obtained which dyes cotton red tints.

(17) When there is used in the preceding example the diarylaminoquinone from 1 molecular proportion of chloranil and 2 molecular proportions of 1-amino-2,4-resorcindiphenylether a dioxazine is obtained, the phenoxy group standing in ortho-position to the amino group being split off. The dioxazine forms large needles. The coloration of the crystals is by transmitted light deep ruby-red.

By sulfonating the dioxazine at ordinary temperature for 1 hour in 20 times its weight of fuming sulfuric acid containing 20 per cent. of sulfuric anhydride a dyestuff is obtained which dyes cotton pink tints.

(18) By substituting in Example 1 for the chloranil benzoquinone, a dioxazine of similar properties is obtained.

By sulfonating it at ordinary temperature for 24 hours in 20 times its weight of fuming sulfuric acid containing 20 per cent. sulfuric anhydride a dyestuff is obtained which dyes cotton orange tints.

(19) By substituting tetrabromoquinone for the tetrachloroquinone in Example 1 a dioxazine of similar properties is obtained.

By heating it for 3 hours on a water bath with 20 times its weight of fuming sulfuric acid containing 20 per cent. of sulfuric anhydride a dyestuff is obtained which dyes cotton reddish-orange tints.

(20) By substituting ortho-aminophenylbenzyl-ether for the ortho-aminodiphenylether used in Example 6 the same dyestuff is thus obtained.

(21) By boiling the starting material used in Example 9 with 4 times its weight of benzoylchloride for 30 minutes and filtering the reaction mass after cooling, the same dyestuff as that obtainable according to the first paragraph of Example 9 is obtained.

We claim:

1. The process which comprises heating in the presence of an aromatic acid chloride of the benzene and naphthalene series a diarylaminoquinone compound of the general formula

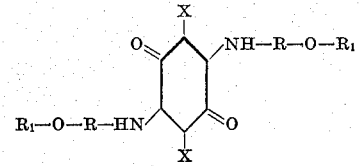

wherein X represents a member of the group consisting of hydrogen, halogen and methyl, R an aromatic radical of the benzene and naphthalene series, $R_1$ a member of the group consisting of the alkyl, aryl and aralkyl groups of the benzene series and wherein the groups R—O—$R_1$ are identical, O—$R_1$ being attached to R in ortho-position to the NH-group.

2. The process which comprises heating in the presence of an aromatic acid chloride of the benzene and naphthalene series and of an inert solvent which may have an oxidizing action, a diarylaminoquinone compound of the general formula

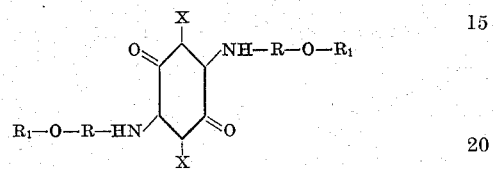

wherein X represents a member of the group consisting of hydrogen, halogen and methyl, R an aromatic radical of the benzene and naphthalene series, $R_1$ a member of the group consisting of the alkyl, aryl and aralkyl groups of the benezene series and wherein the groups R—O—$R_1$ are identical, O—$R_1$ being attached to R in ortho-position to the NH-group.

3. The process which comprises heating in the presence of an aromatic acid chloride of the benzene and naphthalene series and of an inert solvent which may have an oxidizing action a diarylaminoquinone compound of the general formula:

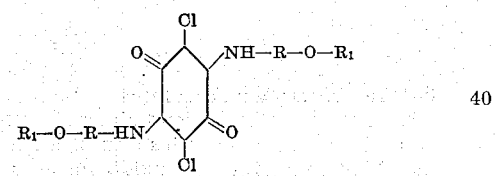

wherein R represents an aromatic radical of the benzene series, $R_1$ a member of the group consisting of the alkyl, aryl and aralkyl groups of the benzene series and wherein the groups R—O—$R_1$ are identical, O—$R_1$ being attached to R in ortho-position to the NH-group.

4. The process which comprises heating in the presence of an aromatic acid chloride of the benzene and naphthalene series a diarylaminoquinone compound of the general formula:

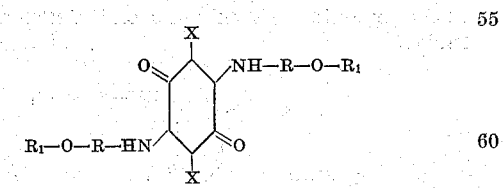

wherein X represents a number of the group consisting of hydrogen, halogen and methyl, R an aromatic radical of the benzene and naphthalene series, $R_1$ a member of the group consisting of the alkyl, aryl and aralkyl groups of the benzene series and wherein the groups R—O—$R_1$ are identical, O—$R_1$ being attached to R in ortho-position to the NH-group, and sulfonating the products thus obtained.

5. The process which comprises heating in the presence of an aromatic acid chloride of the benzene and naphthalene series and of an inert solvent which may have an oxidizing action a diarylaminoquinone compound of the general formula:

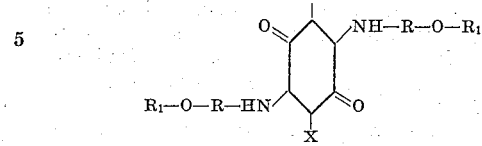

wherein X represents a member of the group consisting of hydrogen, halogen and methyl, R an aromatic radical of the benzene and naphthalene series, R₁ a member of the group consisting of the alkyl, aryl and aralkyl groups of the benzene series and wherein the groups R—O—R₁ are identical, O—R₁ being attached to R in ortho-position to the NH-group, and sulfonating the products thus obtained.

6. The process which comprises heating in the presence of an aromatic acid chloride of the benzene and naphthalene series and of an inert solvent which may have an oxidizing action a diarylaminoquinone compound of the general formula:

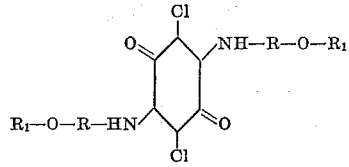

wherein R represents an aromatic radical of the benzene series, R₁ a member of the group consisting of the alkyl, aryl and aralkyl groups of the benzene series and wherein the groups R—O—R₁ are identical, O—R₁ being attached to R in ortho-position to the NH-group, and sulfonating the products thus obtained.

7. The process which comprises boiling in nitrobenzene in the presence of benzoyl-chloride the compound of the following formula:

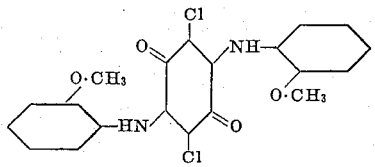

and sulfonating the product thus obtained.

8. The process which comprises boiling in nitrobenzene in the presence of benzoyl-chloride the compound of the following formula:

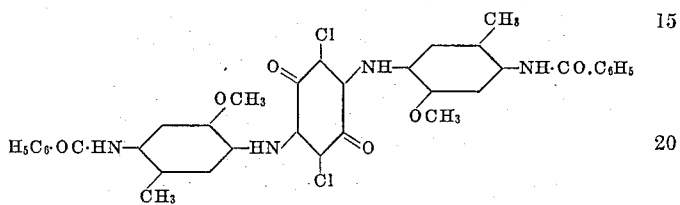

and sulfonating the product thus obtained.

9. The process which comprises boiling in nitrobenzene in the presence of benzoyl-chloride the compound of the following formula:

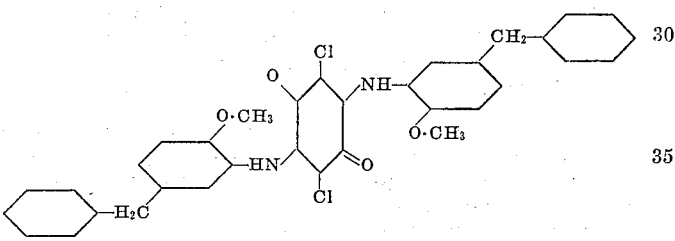

and sulfonating the product thus obtained.

10. The compound identical with that obtainable by the process which comprises boiling in nitrobenzene in the presence of benzoyl-chloride the compound of the following formula:

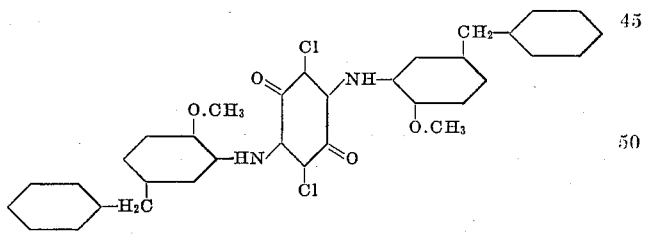

and sulfonating the product thus obtained, which compound dissolves in water to a red solution and yields non-mordanted cotton beautiful red tints.

ARNOLD BRUNNER.
KARL THIESS.